United States Patent
Liu et al.

(10) Patent No.: US 8,942,015 B2
(45) Date of Patent: Jan. 27, 2015

(54) CONTROL DEVICE AND CONTROL METHOD DURING BYPASSING OF POWER UNITS

(75) Inventors: Jia Liu, Taoyuan Hsien (TW); Yong-Qiang Lang, Taoyuan Hsien (TW); Yu-Yang Mao, Taoyuan Hsien (TW)

(73) Assignee: Delta Electronics, Inc. (TW)

( * ) Notice: Subject to any disclaimer, the term of this patent is extended or adjusted under 35 U.S.C. 154(b) by 273 days.

(21) Appl. No.: 13/619,416

(22) Filed: Sep. 14, 2012

(65) Prior Publication Data

US 2013/0322123 A1  Dec. 5, 2013

(30) Foreign Application Priority Data

May 31, 2012  (CN) .............................. 201210182584

(51) Int. Cl.
 *H02M 7/49* (2007.01)
 *H02M 1/32* (2007.01)
(52) U.S. Cl.
 CPC .. *H02M 7/49* (2013.01); *H02M 1/32* (2013.01)
 USPC ......................................................... 363/71
(58) Field of Classification Search
 USPC ......... 363/71, 43, 161–162, 55, 56.01, 56.02, 363/57, 58; 307/77, 82
 See application file for complete search history.

(56) References Cited

U.S. PATENT DOCUMENTS

| 8,004,222 B2 * | 8/2011 | Maddali et al. .......... 318/400.34 |
| 2010/0052322 A1 * | 3/2010 | Fortmann et al. ............... 290/44 |

FOREIGN PATENT DOCUMENTS

| RU | 57527 | 10/2006 |
| RU | 2396663 | 8/2010 |
| SU | 1686600 | 10/1991 |

OTHER PUBLICATIONS

Alepuz, Salvador; Control Strategies Based on Symmetrical Components for Grid-Connected Converters Under Voltage Dips; IEEE Transactions on Industrial Electronics, vol. 56, No. 6, Jun. 2009, pp. 2162-2173.*

Nagy, Istvan; Power Quality Conditioning Based on Space Vector Transformation, IEEE ISIE, Jun. 2005, pp. 789-794.*

* cited by examiner

*Primary Examiner* — Harry Behm

(74) *Attorney, Agent, or Firm* — Lowe Hauptman & Ham, LLP

(57) ABSTRACT

A control device and a control method during bypassing of power units are provided. The method includes: detecting a first three-phase output electrical signal; calculating a first positive sequence component and a first negative sequence component of the first three-phase output electrical signal; providing a given positive sequence component and a given negative sequence component so as to respectively perform the closed-loop compensation on the first positive sequence component and the first negative sequence component, thereby outputting a second positive sequence component and a second negative sequence component; superimposing the second positive sequence component and the second negative sequence component; and outputting a second three-phase output electrical signal in a preset way.

8 Claims, 10 Drawing Sheets

CONTROL DEVICE AND CONTROL METHOD DURING BYPASSING OF POWER UNITS

RELATED APPLICATIONS

This application claims priority to Chinese Application Serial Number 201210182584.X, filed May 31, 2012, which is herein incorporated by reference.

BACKGROUND

1. Field of Invention

The present disclosure relates to topology architecture of a cascade inverter. More particularly, the present disclosure relates to a control device and a control method of the topology architecture during bypassing of power units.

2. Description of Related Art

Currently, a traditional middle, high voltage inverter is subject to the voltage rating of power devices, and moreover, in order to reduce harmonic level of the output voltage, a topology structure of a cascade inverter is usually adopted. In the topology structure, each phase is composed of several series connected power units with a lower voltage rating and could output a high voltage. However, due to the large number of the power units, the reliability of the system might be low since one or more power units have faults. At the moment, the fault power unit should be bypassed and the remain power units will be controlled to output the three-phase voltage in order to ensure continuous operation of the whole cascade inverter system. Meanwhile, after the fault power unit is bypassed, the original control method should be changed, otherwise the three-phase output voltage will be unbalanced.

In the prior art, there are three popular solutions. The first one is same-stage bypass. When faults happen to several power units of one phase, the corresponding power units at the same stage of the other two phases are controlled to be bypassed even without fault, so that a same number of the power units in each phase are assured to work. However, the control method sacrifices the power units without faults and significantly decreases the output voltage. The second one is decreasing the command voltage. Specifically, the command voltage of the phase having fewer fault power units is decreased to guarantee each phase output voltage equal. However, by using this method, not only is the output voltage decreased significantly, but also each of the power units has a great difference in output power and has uneven stress. The third one is neutral point voltage shift. That is, when faults happen to one or more power units of one phase, by changing a phase difference among all of phases, a line to line voltage of the output voltage still can be maintained balanced even when the phase voltage is unbalanced (because the voltage applicable to the load is the line to line voltage). However, the control method requires that all combinations of power units which are possibly bypassed in each of the phases should be exhausted, and the angle between each two phases after bypassing should be calculated offline for each of the combinations. Therefore, a large storage space of the controller is occupied. Additionally, since each phase should be controlled separately, the method is not suitable for a Space Vector Pulse Width Modulation (SVPWM) method. Therefore, the application thereof is restricted in terms of vector control of a converter.

In view of the above, many in the industry are endeavoring to find ways to design a control method of a cascade inverter during bypassing of power units to effectively solve or eliminate defects or disadvantages of the control method above.

SUMMARY

According to the above defects of a control method during bypassing of power units in the prior art, the present disclosure provides a control device and a control method during bypassing of power units.

According to an aspect of the present disclosure, a control device during bypassing of power units is provided, which is applicable to balance a three-phase output voltage of a cascade inverter. The control device includes:

a detection module for detecting the three-phase output voltages;

a calculation module for calculating a negative sequence component of the three-phase output voltage;

a compensation module for providing a given negative sequence component and performing closed-loop compensation based on the negative sequence component from the calculation module according to the given negative sequence component, for outputting a compensated negative sequence component; and an output module, for superimposing the compensated negative sequence component with a three-phase output voltage command and outputting a new three-phase output voltage using a preset modulation way.

The preset modulation way is a Sinusoidal Pulse Width Modulation (SPWM) way or a Space Vector Pulse Width Modulation (SVPWM) way. According to another aspect of the present disclosure, a control method during bypassing of power units is provided, which is applicable to balance a three-phase output voltage of a cascade inverter. The control method includes following steps:

detecting a three-phase output electrical signal by a detection module;

respectively calculating a positive sequence component and a negative sequence component of the three-phase output electrical signal by a calculation module;

providing a given positive sequence component and a given negative sequence component by a compensation module and performing closed-loop compensation on the positive sequence component and the negative sequence component, to output a new positive sequence component and a new negative sequence component; and superimposing the new positive sequence component and the new negative sequence component, and outputting a new three-phase output electrical signal in a preset modulation way.

The preset modulation way is a Sinusoidal Pulse Width Modulation SPWM way or a Space Vector Pulse Width Modulation SVPWM way.

BRIEF DESCRIPTION OF THE DRAWINGS

Various aspects of the present disclosure could be more clearly described and understood by the following specific embodiments of the present disclosure with reference to the accompanying drawings. In the drawings.

DETAILED DESCRIPTION

Figure 1:
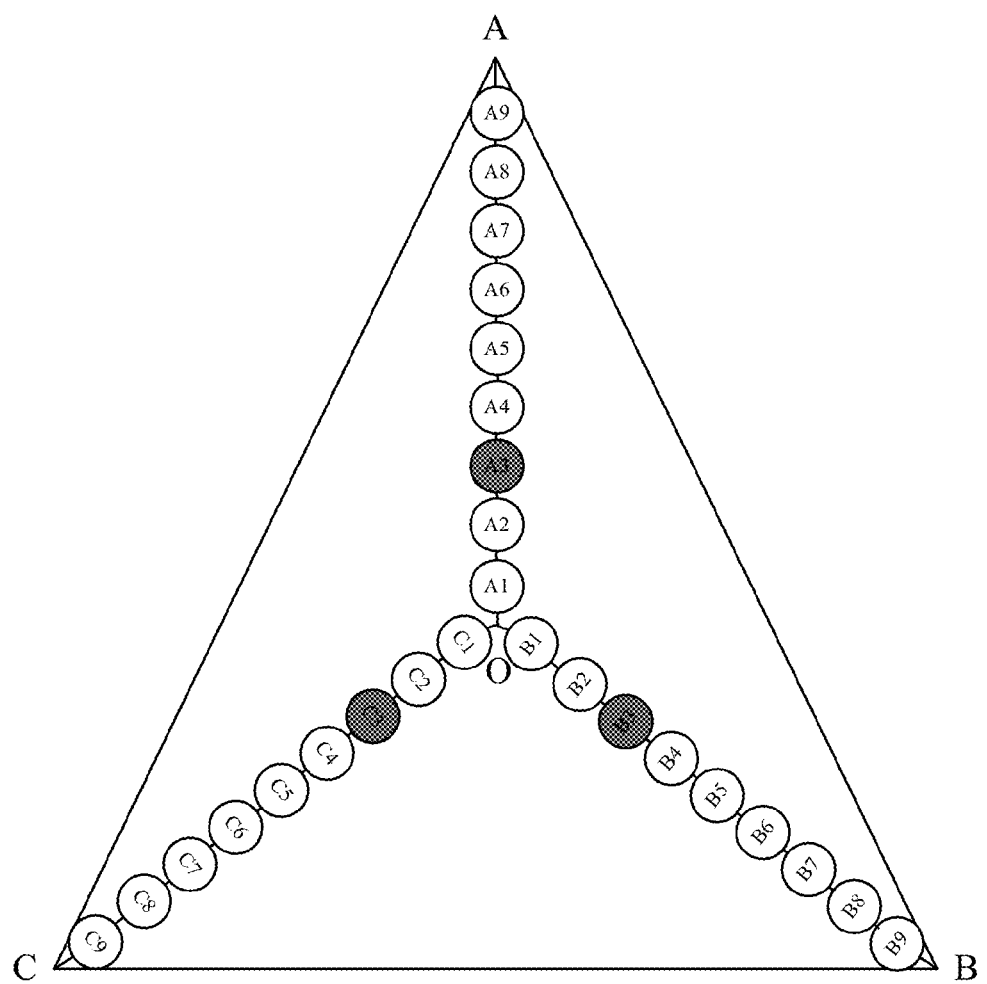
FIG. 1 illustrates a schematic drawing of a control method of a cascade inverter during bypassing of power units of the prior art.

In order to make the description of the present disclosure more detailed and more comprehensive, various embodiments are described below with reference to the accompanying drawings. The same reference numbers are used in the drawings to refer to the same or like elements. However, those of ordinary skills in the art should understand that the embodiments described below are not used for limiting the scope of the present disclosure. Moreover, the accompanying drawings are only illustrative and are not made according to the original size.

For the Detailed Description and the claims of this application, descriptions related to "coupled with" can generally refer to that a component is indirectly connected to another component through other components, or the component is directly connected to another component through no other components.

For the Detailed Description and the claims of this application, except articles are specifically limited in the context, otherwise, "a/an" and "the" refer to one or more.

The phrase "about", "approximately" or "roughly" in the context is used for modifying any micro-variable quantity, but these micro-variations do not change the nature of the quantity. In the embodiments the error of the quantity modified by the phrase "about", "approximately" or "roughly" is in a range of 20%, preferably in a range of 10%, and more preferably in a range of 5%, unless expressly specified otherwise.

As described above, in the topology architecture of the cascade inverter, each phase is formed by connecting several power units in series. When all of the power units are operated normally, a three-phase output voltage is kept in balance (that is, a line to line voltage between any two adjacent phases is equal), so as to power supply the load through the line to line voltage. However, when faults happen to one or more power units, the fault power unit should be bypassed. Moreover, the three-phase output voltage after bypassing is substantially kept in balance through a corresponding method.

In addition, the terms "three-phase output voltage" and "sequence component" in the present disclosure can be represented by physical voltages or commands (or signals).

FIG. 1 illustrates a schematic drawing of applying a conventional control method to a cascade inverter during bypassing of power units.

Referring to FIG. 1, in the schematic drawing, a connection line between a point A and a point O represents phase A, which includes 9 power units A1-A9 connected in series. A connection line between a point B and the point O represents phase B, which includes 9 power units B1-B9 connected in series. A connection line between a point C and the point O represents phase C, which includes 9 power units C1-C9 connected in series. Line segments AB, BC and CA represent line to line voltages. When an operation fault happens to the power unit A3 of the phase A, the power unit A3 is bypassed. At this moment, since the number of power units in the normal operation state in the phase A is decreased from 9 to 8, a phase voltage of the phase A is decreased. Therefore, it is unbalanced among the three-phase output line voltages AB, BC and CA.

In order to solve the problem, the power units on other two phases, such as the power units B3 and C3 shown in FIG. 1, corresponding to the power unit A3 of the phase A, are bypassed by utilizing the conventional control method. Specifically, if each phase voltage of the phase A, the phase B and the phase C is U, the power units are each provided with the voltages of 1/9 U. That is, after the power units A3, B3 and C3 are bypassed, the phase voltages of three phases are each decreased to 8/9 U. Although the control method can achieve a voltage balance effect, the power units B3 and C3 which have no fault are sacrificed, and furthermore the output voltage is decreased greatly.

Figure 2:
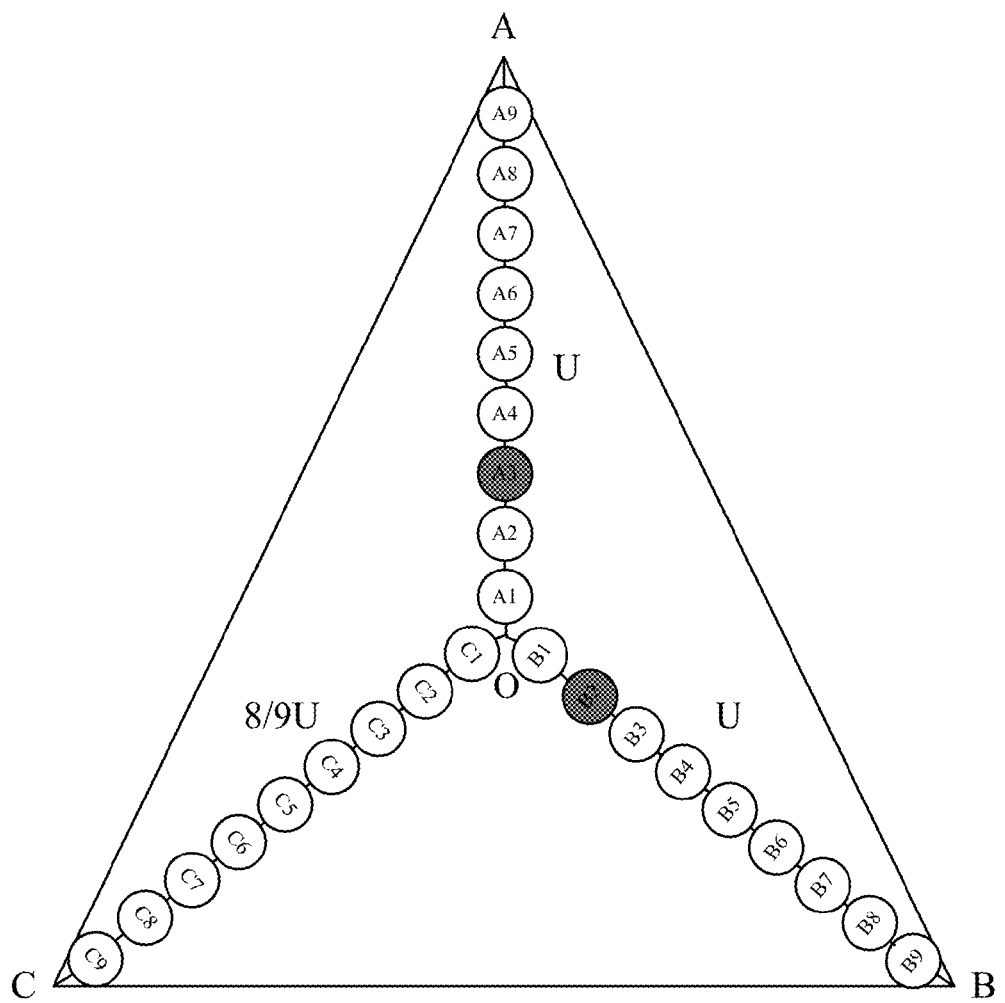
FIG. 2 illustrates a schematic drawing of another control method of a cascade inverter during bypassing of the power units of the prior art.

FIG. 2 illustrates a schematic drawing of applying another conventional control method to a cascade inverter during bypassing of the power units.

Referring to FIG. 2, assuming that each original phase voltage of the phase A, the phase B and the phase C is U, the power units are each provided with the voltage of 1/9 U. When an operation fault happens to the power unit A3 of the phase A and the power unit B2 of the phase B, the power units A3 and B2 are bypassed. At this moment, since the number of the power units in the normal operation state in the phase A and the phase B is decreased from 9 to 8, the phase voltage of the phase A and that of the phase B are decreased. Therefore, it is unbalanced among the three-phase output line to line voltages AB, BC and CA.

In order to solve the problem, a command voltage of the phase C is decreased by utilizing the conventional control method, without sacrificing any power unit having no fault. For example, the command voltage of the phase C is decreased to 8/9 U. However, the control method also results in great decrease of the output voltage, and moreover each of the power units has a great difference in output power and has uneven stress. Additionally, the control method requires that each of the phases should be controlled. Therefore, it is not applicable for a Space Vector Pulse Width Modulation (SVPWM) way.

Figure 3A:
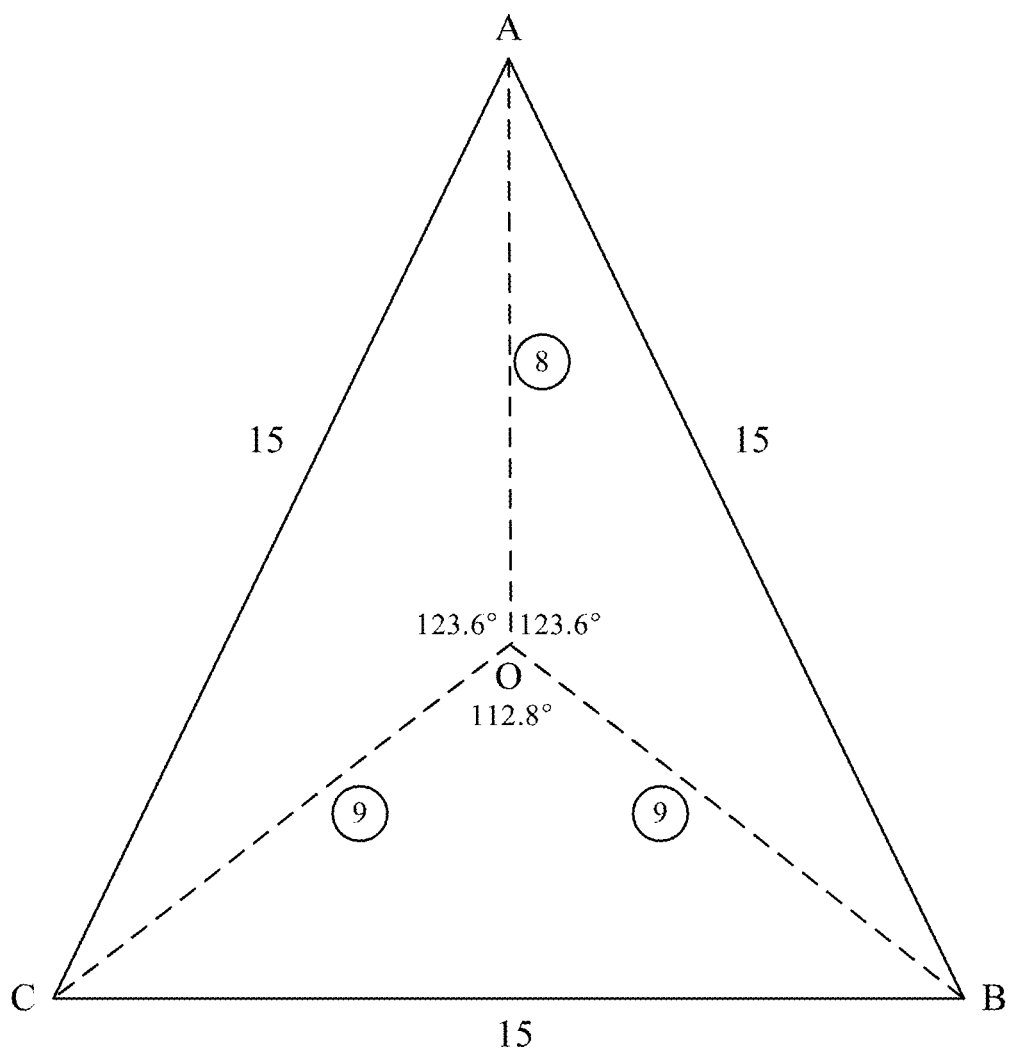
FIGS. 3A and 3B illustrate a schematic drawing of yet another control method of the cascade inverter during bypassing of different power units of the prior art.
Figure 3B:
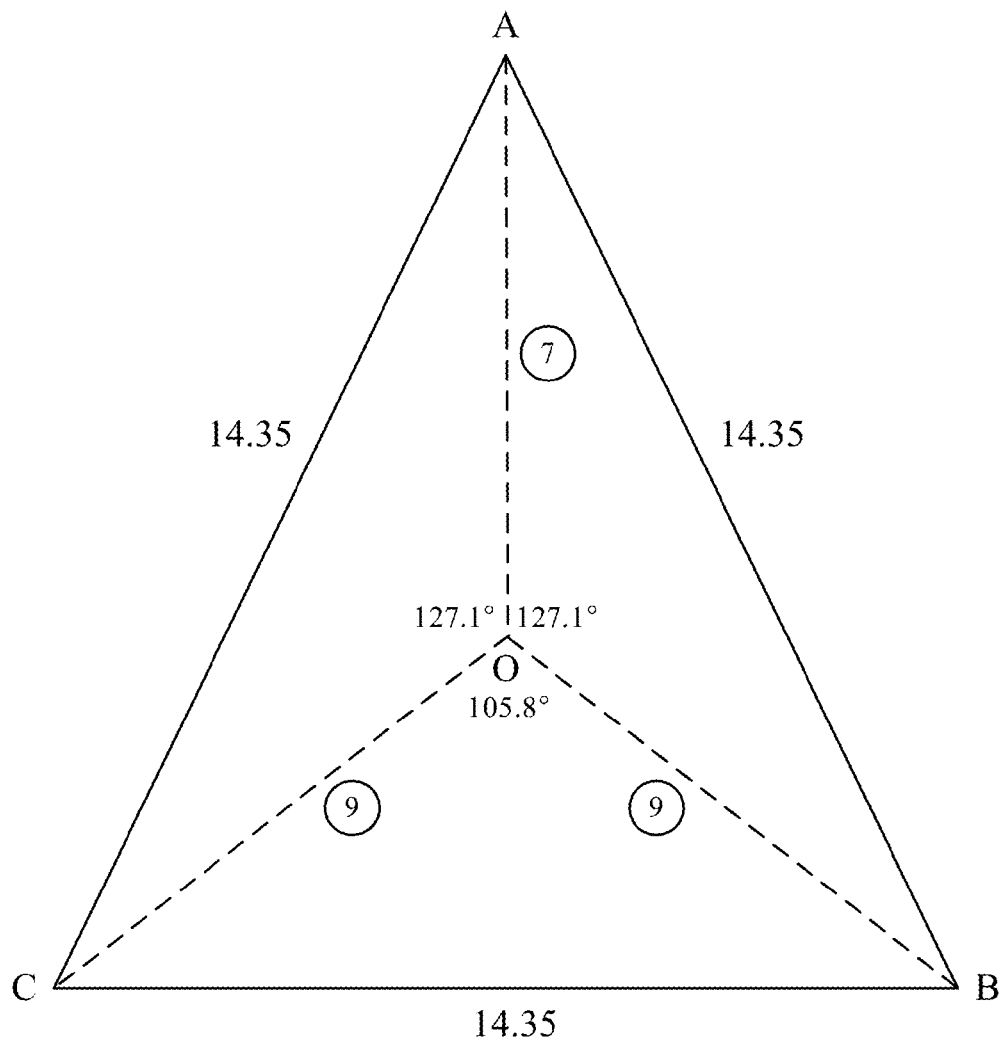

FIGS. 3A and 3B illustrate a schematic drawing of applying yet another conventional control method to the cascade inverter during bypassing of different power units.

Referring to FIG. 3A, when an operation fault happens to one power unit of the phase A (the total number of the power units is decreased from 9 to 8), the output voltages of the three phases are kept in balance as far as possible by changing the phase difference between each two adjacent phases. For example in FIG. 3A, the phase difference between the phase A and the phase C is 123.6 degrees and the phase difference between the phase A and the phase B is also 123.6 degrees. However, in order to keep balance among the line to line voltages, the phase difference between the phase B and the phase C is 112.8 degrees. Therefore, although the phase voltage of the phase A is different from that of the phase B and that of the phase C, the three-phase output line to line voltages AB, BC and CA are the same (for example, each of the three line segments shown in FIG. 3A has a length of 15).

Referring to FIG. 3B, when an operation fault happens to any two power units of the phase A (the total number of the power units is decreased from 9 to 7), similarly the control method also keeps the output voltages of the three phases in balance as far as possible by changing the phase difference between two adjacent phases. For example, in FIG. 3B, the phase difference between the phase A and the phase C is 127.1 degrees and the phase difference between the phase A and the phase B is also 127.1 degrees. However, in order to keep the balance among the line to line voltages, the phase difference between the phase B and the phase C is 105.8 degrees. Therefore, although the phase voltage of the phase A is different from that of the phase B and that of the phase C, the three-phase output line to line voltages AB, BC and CA are the same (for example, each of the three line segments shown in FIG. 3B has a length of 14.35).

However, either in FIG. 3A or 3B, the control method requires that all combinations of power units which are possibly bypassed in each of the phases should be exhausted, and the angle between each two phases after bypassing should be calculated offline for each of the combinations. Since the power units in each of the phases have plural kinds of faults, after the condition of each of the three phases is combined, many angle parameters may be generated, such as the individual phase difference between the phase A and the phase B, between the phase B and the phase C and between the phase C and the phase A, which has high requirements of the storage space of the controller. In addition, the angle parameter is generally a floating number, and requires more storage space to store. On the other hand, the control method also requires that each of the phases should be controlled, so it is also not applicable for the SVPWM way. Therefore, the application thereof is restricted in terms of vector control of a converter.

Figure 4:
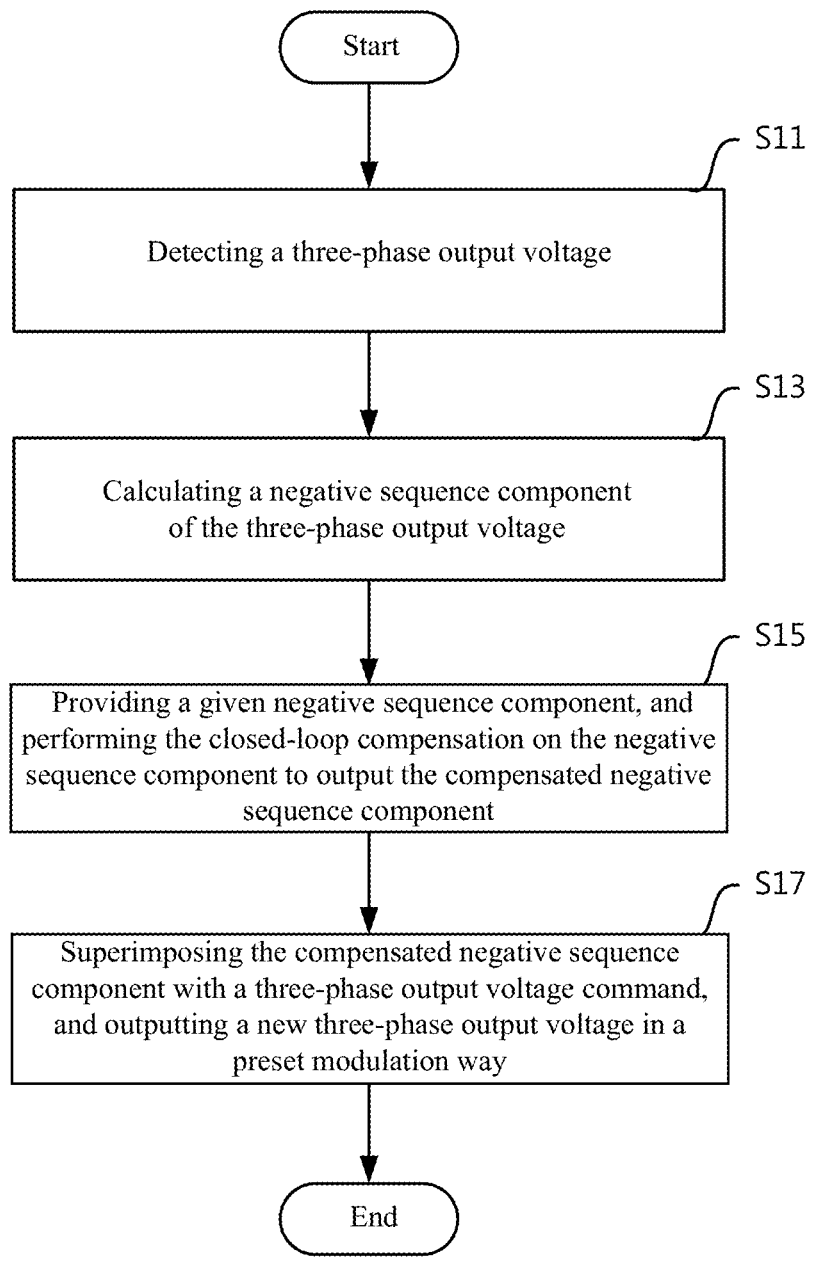
FIG. 4 illustrates a flow block diagram of a control method of a cascade inverter during bypassing of power units according to an embodiment of the present disclosure.

FIG. 4 illustrates a flow chart of a control method of a cascade inverter during bypassing of power units according to an embodiment of the present disclosure. Referring to FIG. 4, in the control method of the present disclosure, first in the step S11, the three-phase output voltage of the cascade inverter is detected. Next, in the step S13, the negative sequence component of the detected three-phase output voltage is calculated. It should be pointed out that the positive sequence component and the negative sequence component of the voltage (or current) (a three-phase four-wire circuit may further include a zero sequence component) are used to decompose asymmetric three-phase voltage (or current) for analysis. In an ideal situation, the three-phase voltage is symmetric (or referred to as being kept in balance), so that the negative sequence component of the voltage is zero. When a fault happens to the system, the three-phase voltage is asymmetric. At this moment, the negative sequence component has a certain value of amplitude. It can be seen from that any three-phase voltage (or current) can be decomposed into a positive sequence component and a negative sequence component. When the three-phase voltage (or current) is kept in balance, the three-phase voltage only includes the positive sequence component, and the negative sequence component is zero. When the three-phase voltage (or current) is unbalanced, the three-phase voltage not only includes the positive sequence component, but also includes the negative sequence component which has a certain value of amplitude.

Subsequently, in step S15, a given negative sequence component is provided, so as to perform the closed-loop compensation on the negative sequence component of the voltage and then output the compensated negative sequence component. At last, in the step S17, the compensated negative sequence component is superimposed with a three-phase output voltage command, and a new three-phase output voltage is outputted in the preset modulation way.

According to a specific embodiment, the given negative sequence provided in the step S15 is zero. However, the disclosure is not limited to this. For example, in other embodiments, the given negative sequence component may also be set to be a threshold value adjacent to the zero.

According to another specific embodiment, in the above step S15, the closed-loop compensation is performed on the negative sequence component by means of a compensator. The compensator includes, but not limited to, a proportion compensator (P), a proportion integration compensator (PI), a proportion resonance compensator (PR) and a proportion integration differential compensator (PID). It should be pointed out that the compensator can directly compensate the negative sequence component calculated in the step S13. It can also perform closed-loop compensation on a quantity of the calculated negative sequence component after a coordinate transformation. For example, the coordinate system is changed from the three-phase coordinate system (hereinafter referred to as an abc coordinate system) to a two-phase static coordinate system (hereinafter referred to as a αβ coordinate system). Alternatively, the coordinate system is changed from the abc coordinate system to the two-phase coordinate system (hereinafter referred to as a dq coordinate system).

According to yet another embodiment, the preset modulation way is either a Sinusoidal Pulse Width Modulation SPWM way or a Space Vector Pulse Width Modulation SVPWM way.

Before plural following embodiments are described in details, the three-phase output voltage in the abc coordinate system might be preset to be $U_{out(abc)}$. The positive sequence component of the three-phase output voltage is $U_{(1)(abc)}$. The negative sequence component in the three-phase output voltage is $U_{(2)(abc)}$. The desired value of the three-phase output voltage is $U_{out(abc)}^*$. The three-phase output current is $I_{out(abc)}$. The positive sequence component of the three-phase output current is $I_{(1)(abc)}$. The negative sequence component of the three-phase output current is $I_{(2)(abc)}$. The desired value of the three-phase output current is $I_{out(abc)}^*$. Similarly, the three-phase output voltage in the αβ coordinate system is $U_{out(\alpha\beta)}$. The positive sequence component of the three-output voltage is $U_{(1)(\alpha\beta)}$. The negative sequence component of the three-phase output voltage is $U_{(2)(\alpha\beta)}$. The desired value of the three-phase output voltage is $U_{out(\alpha\beta)}^*$. The three-phase output current is $I_{out(\alpha\beta)}$. The positive sequence component of the three-phase output current is $I_{(1)(\alpha\beta)}$. The negative sequence component of the three-phase output current is $I_{(2)(\alpha\beta)}$. The desired value of the three-phase output current is $I_{out(\alpha\beta)}^*$. The three-phase output voltage in the dq coordinate system is $U_{out(dq)}$. The positive sequence component of the three-phase output voltage is $U_{(1)(dq)}$. The negative sequence component of the three-phase output voltage is $U_{(2)(dq)}$. The desired value of the three-phase output voltage is $U_{out(dq)}^*$. The three-phase output current is $I_{out(dq)}$. The positive sequence component of the three-phase output current is $I_{(1)(dq)}$. The negative sequence component of the three-phase output current is $I_{(2)(dq)}$. The desired value of the three-phase output current is $I_{out(dq)}^*$.

Figure 5:
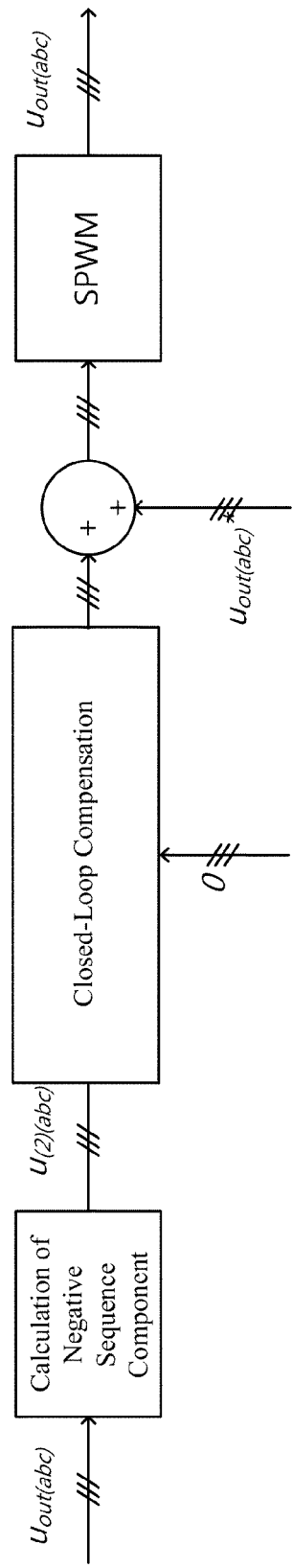
FIG. 5 illustrates a specific embodiment of controlling an output voltage through the control method shown in FIG. 4.

FIG. 5 illustrates a specific embodiment of controlling an output voltage through the control method shown in FIG. 4.

Referring to FIG. 5, the control method outputs the controlled three-phase output voltage $U_{out(abc)}$ in the SPWM way. In this embodiment, the current three-phase output voltage $U_{out(abc)}$ is detected. Subsequently, the negative sequence component $U_{(2)(abc)}$ is calculated and separated. Afterwards, the closed-loop compensation (for example, providing a given negative sequence component 0) is performed on the negative sequence component $U_{(2)(abc)}$. The compensated negative sequence component is superimposed with the desired value $U_{out(abc)}*$ of the three-phase output voltage. Finally, the controlled three-phase output voltage $U_{out(abc)}$ is modulated in the SPWM way.

Those skilled in the art should know that FIG. 5 not only can be used for illustrating the control method for the three-phase output voltage when the power unit of the cascade inverter is bypassed, but also can be used for illustrating the control device corresponding to the control method. More particularly, the control device includes a detection module, a calculation module, a compensation module and an output module. The detection module detects a three-phase output voltage $U_{out(abc)}$. The calculation module calculates the negative sequence component $U_{(2)(abc)}$ of the three-phase output voltage from the detection module. The compensation module is used for providing a given negative sequence component of 0 and performing the closed-loop compensation on the negative sequence component $U_{(2)(abc)}$ from the calculation module according to the given negative sequence component, so as to output the compensated negative sequence component. The output module superimposes the compensated negative sequence component with a three-phase output voltage, and outputs the new three-phase output voltage $U_{out(abc)}$ in the SPWM way.

Figure 6:
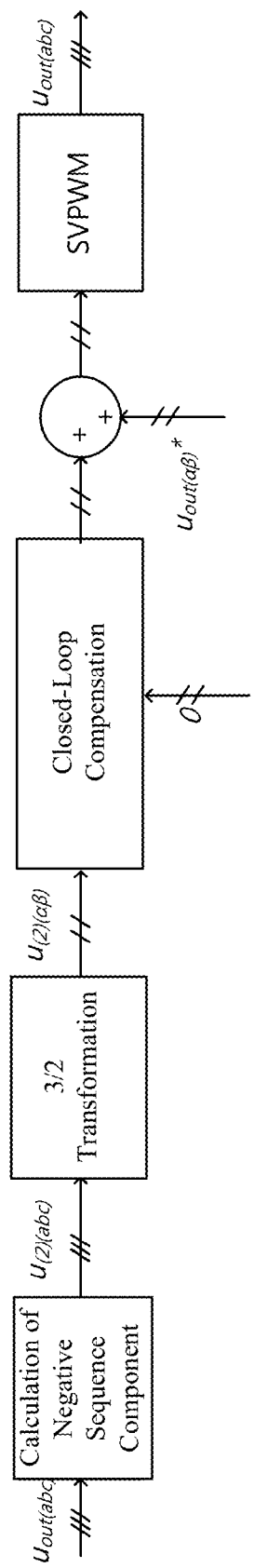
FIG. 6 illustrates another specific embodiment of controlling an output voltage through the control method shown in FIG. 4.

FIG. 6 illustrates another specific embodiment of controlling an output voltage utilizing the control method shown in FIG. 4.

Referring to FIG. 6, the control method is utilized to output the controlled three-phase output voltage $U_{out(abc)}$ in the SVPWM way. In this embodiment, the current three-phase output voltage $U_{out(abc)}$ is detected, and the negative sequence component $U_{(2)(abc)}$ is calculated and separated. Different from FIG. 5, the control method shown in FIG. 6 is configured to perform 3/2 transformation (i.e., the coordinate transformation from the abc coordinate system to the αβ coordinate system) for the calculated negative sequence component $U_{(2)(abc)}$ to obtain the negative sequence component $U_{(2)(\alpha\beta)}$ in the two-phase static coordinate system. Subsequently, the closed-loop compensation (for example, providing a given negative sequence component of 0) is performed on the negative sequence component $U_{(2)(\alpha\beta)}$. The compensated negative sequence component is superimposed with the desired value $U_{out(\alpha\beta)}*$ the three-phase output voltage. Afterwards, the controlled three-phase output voltage $U_{out(abc)}$ is modulated in the SVPWM way. Herein, the component inputted in the SVPWM way should be a component in the αβ coordinate system. Therefore, before the closed-loop compensation of the negative sequence component, the negative sequence component $U_{(2)(abc)}$ in the abc coordinate system should be transformed to the negative sequence component $U_{(2)(\alpha\beta)}$ in the αβ coordinate system.

Figure 7:
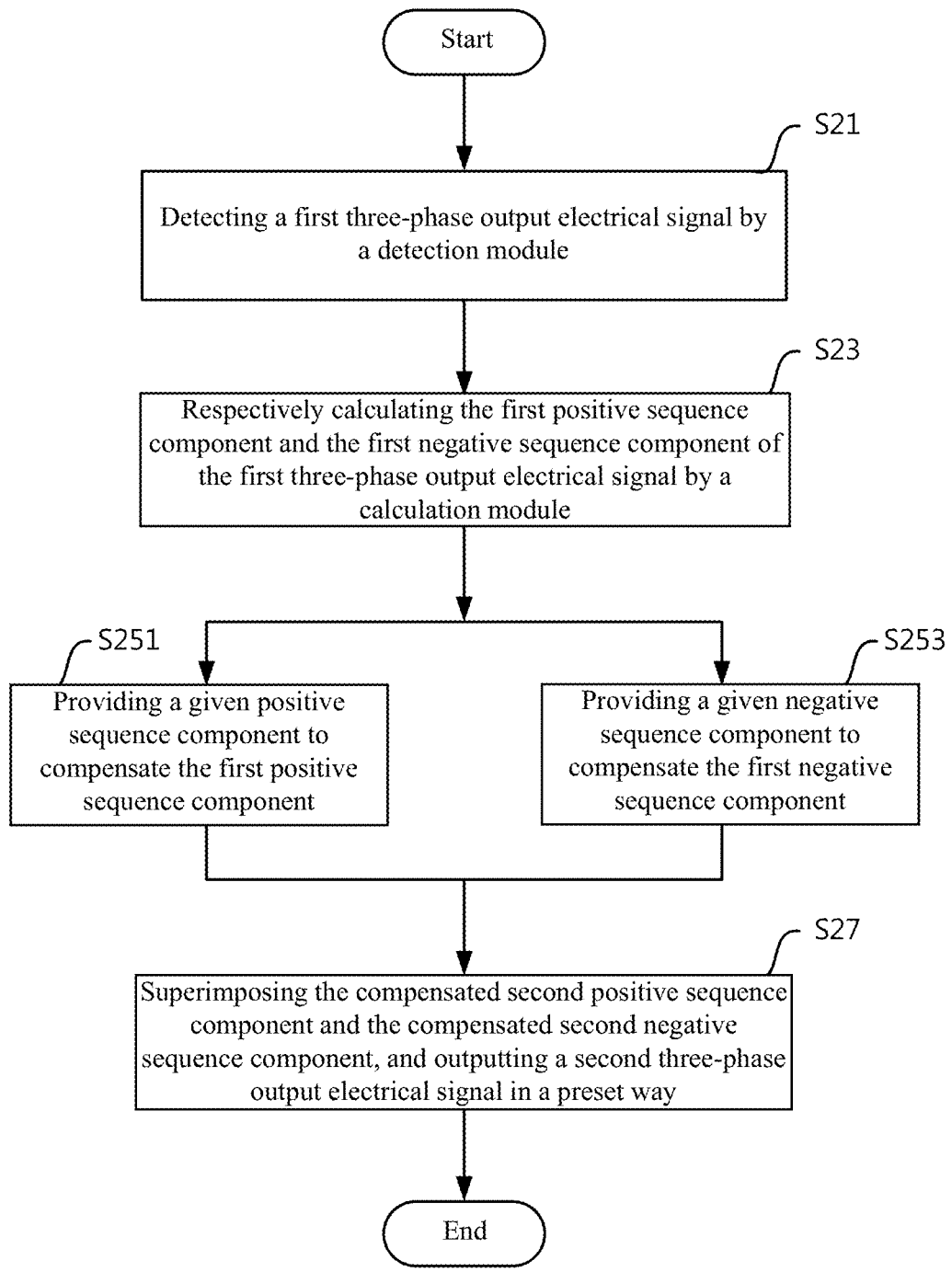
FIG. 7 illustrates a flow block diagram of a control method of a cascade inverter during bypassing of power units according to another embodiment of the present disclosure.

FIG. 7 illustrates a flow chart of a control method for a cascade inverter during bypassing of power units according to another embodiment of the present disclosure.

Referring to FIG. 7, in this embodiment, first in the step S21, a first three-phase output electrical signal of the cascade inverter is detected. Herein, the electrical signal may be not only a voltage signal, but also a current signal. Subsequently, in the step S23, a first positive sequence component and a first negative sequence component of the first three-phase output electrical signal are each calculated. Subsequently, in the steps S251 and S253, a given positive sequence component is provided and the closed-loop compensation is performed on the calculated first positive sequence component, and then a given negative sequence component is provided and the closed-loop compensation is performed on the calculated first negative sequence component, so as to output a second positive sequence component and a second negative sequence component. At last, in the step S27, the compensated second positive sequence component and the compensated second negative sequence component are superimposed, and a second three-phase output electrical signal is outputted in the preset modulation way.

It should be pointed out that the steps S251 and S253 are not specially sequenced. The closed-loop compensation may be first performed on the first positive sequence component, and then on the first negative sequence component. Alternatively, the closed-loop compensation may be first performed on the first negative sequence component, and then on the first positive sequence component. Additionally, the closed-loop compensation may be performed on the first positive sequence component and the first negative sequence component at the same time.

According to still yet another specific embodiment, the preset modulation way above is either a Sinusoidal Pulse Width Modulation SPWM way or a Space Vector Pulse Width Modulation SVPWM way. Furthermore, when the modulation way is the SPWM way, the given positive sequence component is the desired value of the first three-phase output electrical signal in the three-phase coordinate system.

According to a specific embodiment, a given negative sequence component is zero.

Figure 8:
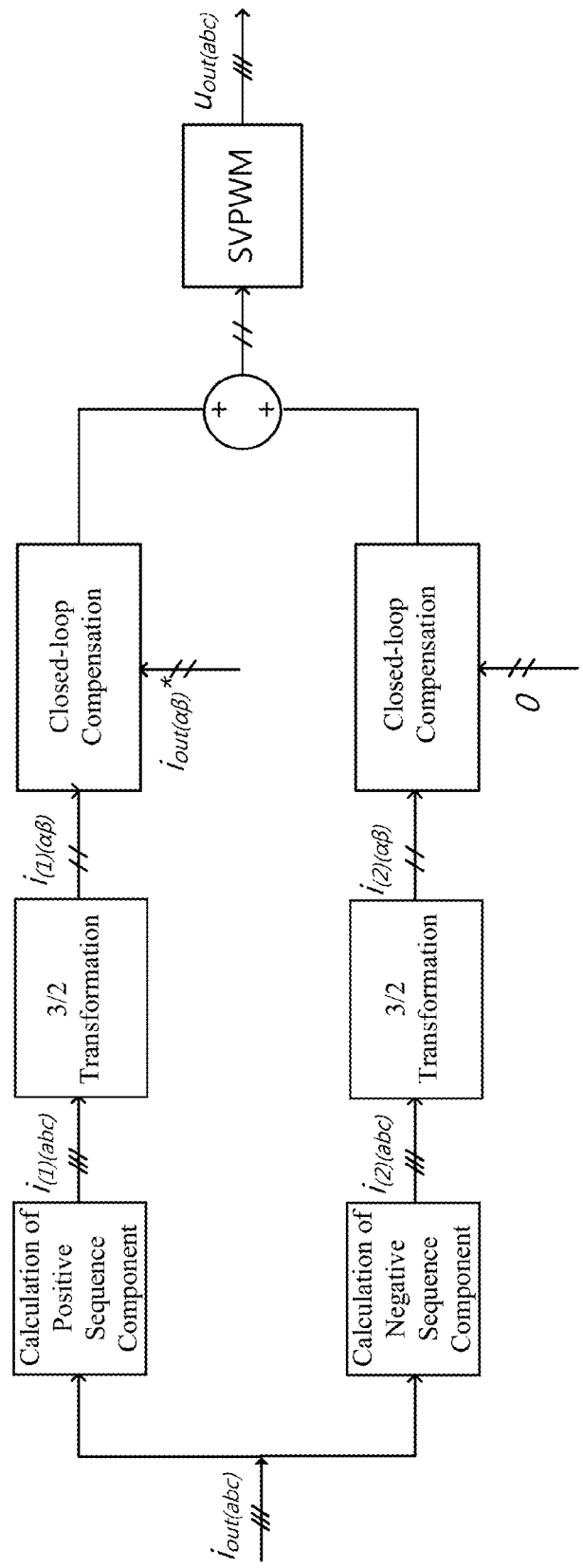
FIG. 8 illustrates an specific embodiment of controlling an output voltage through the control method shown in FIG. 7.

FIG. 8 illustrates a specific embodiment of controlling an output voltage utilizing the control method shown in FIG. 7.

Referring to FIG. 8, the control method outputs the controlled three-phase output voltage $U_{out(abc)}$ in the SVPWM way. In this embodiment, the three-phase output current $I_{out(abc)}$ is illustrated as a detection quantity. However, the invention is not limited to this. For example, the three-phase output voltage $U_{out(abc)}$ can also be used as a detection quantity.

Specially, a three-phase output current $I_{out(abc)}$ of the cascade inverter is detected, and a first positive sequence component $I_{(1)(abc)}$ and a first negative sequence component $I_{(2)(abc)}$ of the three-phase output current are calculated respectively. Subsequently, the 3/2 transformation is performed on the positive sequence component $I_{(1)(abc)}$ in the abc coordinate system, thereby obtaining the first positive sequence component in the αβ coordinate system, i.e., $I_{(1)(\alpha\beta)}$. After a given positive sequence component $I_{out(\alpha\beta)}*$ is provided, the closed-loop compensation is performed based on the quantity $I_{(1)(\alpha\beta)}$. Meanwhile, the 3/2 transformation is performed on the negative sequence component $I_{(2)(abc)}$ in the abc coordinate system, thereby obtaining the first negative sequence component in the αβ coordinate system, i.e., $I_{(2)(\alpha\beta)}$. After a given negative sequence component 0 is provided, the closed-loop compensation is performed based on the quantity $I_{(2)(\alpha\beta)}$. At last, the compensated second positive sequence component and the compensated second negative sequence component are superimposed, and moreover the second three-phase output electrical signal is outputted in the SVPWM way.

In some other embodiments, the controlled three-phase output voltage may be outputted in the SPWM way. For example, the closed-loop compensation is directly performed on the calculated first positive sequence component $I_{(1)(abc)}$ and the first negative sequence component $I_{(2)(abc)}$. After the compensated second positive sequence component and the compensated second negative sequence component are superimposed, the three-phase output voltage is modulated in the SPWM way. For example, the 3/2 transformation shown in FIG. 8 is reserved, and only after the second positive sequence component and the second negative sequence component, which undergo the closed-loop compensation, are superimposed, the 2/3 transformation is performed (i.e., the coordination transformation from the αβ coordinate system to the abc coordinate system). Afterwards, the three-phase output voltage is modulated in the SPWM way.

According to another specific embodiment, the control method further includes the abc/dq coordination transformation performed respectively on the first positive sequence component and the first negative sequence component, so as to obtain their corresponding quantities in the two-phase rotational coordinate system, for the closed-loop compensation.

Figure 9:
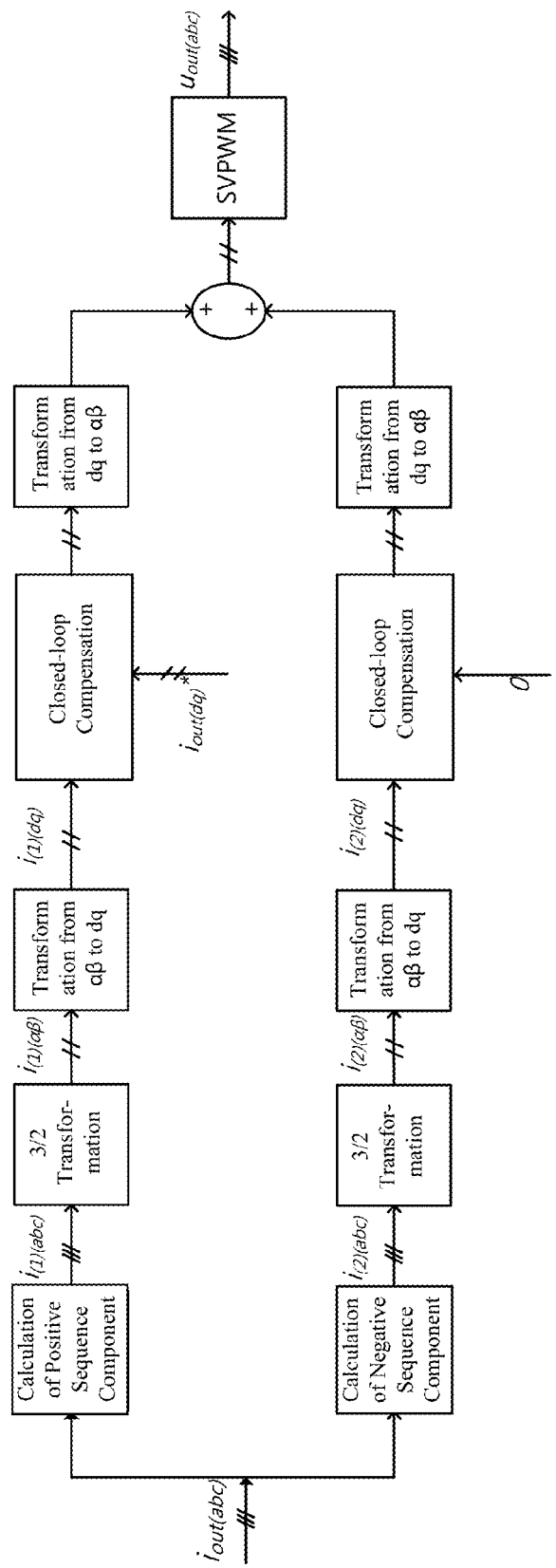
FIG. 9 illustrates another specific embodiment of controlling an output voltage through the control method shown in FIG. 7.

FIG. 9 illustrates another specific embodiment of controlling an output voltage utilizing the control method shown in FIG. 7.

Similar to FIG. 8, the control method shown in FIG. 9 outputs the controlled three-phase output voltage $U_{out(abc)}$ in the SVPWM way. In this embodiment, the three-phase output current $I_{out(abc)}$ is described as a detection quantity. However, the present disclosure is not limited to this. For example, the three-phase output voltage $U_{out(abc)}$ also can be taken as a detection quantity.

The difference between FIGS. 9 and 8 lies in that after the 3/2 transformation is performed respectively on the positive sequence component $I_{(1)(abc)}$ and the negative sequence component $I_{(2)(abc)}$, the αβ/dq transformation is further performed on $I_{(1)(\alpha\beta)}$ and $I_{(2)(\alpha\beta)}$ in the two-phase static coordinate system, so as to obtain the rotation quantity $I_{(1)(dq)}$ and $I_{(2)(dq)}$. Subsequently, after a given positive sequence component $I_{out(dq)}$ is provided, the closed-loop compensation is performed on the rotation quantity of the calculated first positive sequence component. After a given negative sequence component of 0 is provided, the closed-loop compensation is performed on the rotation quantity $I_{(2)(dq)}$ of the calculated first negative sequence component. Since the positive sequence component and the negative sequence component in the two-phase rotational coordinate system (dq coordinate system) of the compensated calculation module output cannot be directly superimposed, the dq/αβ coordinate transformation should be performed to obtain its components in the αβ coordinate system which finally are superimposed and outputted in the SVPWM way.

In some embodiment, the 3/2 transformation and the αβ/dq transformation may be combined by directly utilizing the abc/dq transformation. Therefore, the rotation quantity $I_{(1)(dq)}$ of the first positive sequence component and the rotation quantity $I_{(2)(dq)}$ of the first negative sequence component in the two-phase rotational coordinate system may also be obtained.

In some embodiments, the SPWM way may also be used for outputting the controlled three-phase output voltage. For example, the dq/abc coordinate transformation is performed respectively on the second positive sequence component and the second negative component which undergoes the closed-loop compensation, so as to get the components in the three-phase coordinate system, and to output the second three-phase output voltage after superimposing.

By using the control device and the control method of the present disclosure during bypassing of the power units, that is performing the closed-loop compensation on the negative sequence component of the three-phase output voltage, the cascade inverter can still maintain balance of the output voltage. Additionally, in the present disclosure the closed-loop compensation can be performed respectively on the positive sequence component and the negative sequence component of the three-phase output electrical signal (such as the voltage or the current), and the compensated positive sequence component is further superimposed with the compensated negative sequence component, so as to similarly balance the three-phase output electrical signal of the cascade inverter. In comparison with the prior art, the embodiments in the present disclosure not only can be applied to effectively utilize all of the power units having no fault, but also can be applied such that the output voltage is decreased slightly, even substantially unchanged. In addition, the control method is not only applicable for the SPWM way, but also applicable for the SVPWM modulation way. Therefore, it is of good compatibility in terms of vector control on the converter.

As mentioned above, the specific embodiments of the invention are described with reference to the accompanying drawings. However, those of ordinary skills in the art should understand that various modifications and variations can also be made to the specific embodiments of the present disclosure without departing from the spirit and scope of the present disclosure. These modifications and variations should fall within the scope of the claims of the present disclosure.

What is claimed is:

1. A control device during bypassing of power units, being applicable to balance a three-phase output voltage of a cascade inverter, the control device comprising:
    a detection module for detecting the three-phase output voltage;
    a calculation module for calculating a negative sequence component of the three-phase output voltage;
    a compensation module for providing a given negative sequence component and performing closed-loop compensation based on the negative sequence component from the calculation module according to the given negative sequence component, for outputting the compensated negative sequence component; and
    an output module for superimposing the compensated negative sequence component with a three-phase output voltage command and outputting a new three-phase output voltage using a modulation way;
    wherein the modulation way is a Sinusoidal Pulse Width Modulation (SPWM) way or a Space Vector Pulse Width Modulation (SVPWM) way, and when the modulation way is the SVPWM way, the calculation module is further used for performing abc/αβ coordinate transformation on the calculated negative sequence component, so as to obtain a negative sequence component in a two-phase static coordinate system, and the compensation module performs the closed-loop compensation on the negative sequence component in the two-phase static coordinate system according to the given negative sequence component to output the compensated negative sequence component.

2. A control method during bypassing of the power units, being applicable to balance a three-phase output voltage of a cascade inverter, the method comprising:
    detecting a first three-phase output electrical signal by a detection module;
    respectively calculating a first positive sequence component and a first negative sequence component of the first three-phase output electrical signal by a calculation module;
    providing a given positive sequence component and a given negative sequence component by a compensation module and performing closed-loop compensation on the first positive sequence component and the first negative sequence component, to output a second positive sequence component and a second negative sequence component; and superimposing the second positive sequence component and the second negative sequence component, and outputting a second three-phase output electrical signal in a modulation way;

wherein the modulation way is a Sinusoidal Pulse Width Modulation SPWM way or the Space Vector Pulse Width Modulation SVPWM way, and when the modulation way is the SPWM way, the given positive sequence component is a desired value of the first three-phase output electrical signal in a three-phase coordinate system.

3. The control method of claim 2, wherein when the modulation way is the SVPWM way, the control method further comprises:

respectively performing coordinate transformation on the calculated first positive sequence component and the calculated first negative component to obtain a corresponding static quantity of the first positive sequence component and a corresponding static quantity of the first negative sequence component in the two-phase static coordinate system so as to respectively perform the closed-loop compensation.

4. The control method of claim 3, wherein the given positive sequence component is a desired value of the first three-phase output electrical signal in the two-phase static coordinate system.

5. The control method of claim 2, further comprising:

respectively performing coordinate transformation on the calculated first positive sequence component and the calculated first negative sequence component to obtain a corresponding rotation quantity of the first positive sequence component and a corresponding rotation quantity of the first negative sequence component in a two-phase rotational coordinate system so as to respectively perform the closed-loop compensation.

6. The control method of claim 2, wherein when the modulation way is the SPWM way, the superimposing step further comprises:

respectively performing coordinate transformation on the compensated second positive sequence component and the compensated second negative sequence component to obtain a quantity of the second positive sequence component and a quantity of the second negative sequence component in a three-phase coordinate system, and further outputting the second three-phase output electrical signal after superimposing.

7. The control method of claim 2, wherein when the modulation way is the SVPWM way, the superimposing step further comprises:

respectively performing coordinate transformation on the compensated second positive sequence component and the compensated second negative sequence component to obtain a quantity of the second positive sequence component and a quantity of the second negative sequence component in a three-phase coordinate system, and further outputting the second three-phase output electrical signal after superimposing.

8. The control method of claim 2, wherein the given negative sequence component is zero.

* * * * *